TAPE PUNCHING MACHINE

Filed March 17, 1967 3 Sheets-Sheet 1

INVENTOR.
DERYCK A. GERARD
BY
Adams Cwayna & Haugen
ATTORNEYS

Sept. 16, 1969 D. A. GERARD 3,467,306

TAPE PUNCHING MACHINE

Filed March 17, 1967 3 Sheets-Sheet 2

INVENTOR.
DERYCK A. GERARD
BY
Adams Quayna & Haugen
ATTORNEYS

INVENTOR.
DERYCK A. GERARD
BY
Adams Quayne & Haugen
ATTORNEYS

United States Patent Office 3,467,306

Patented Sept. 16, 1969

3,467,306

TAPE PUNCHING MACHINE

Deryck A. Gerard, Minneapolis, Minn., assignor to Production Engineering Corporation, Minneapolis, Minn., a corporation of Minnesota Filed Mar. 17, 1967, Ser. No. 623,887
Int. Cl. G06k *1/00, 1/10*
U.S. Cl. 234—32 6 Claims

ABSTRACT OF THE DISCLOSURE

There is disclosed a hand operated machine for punching signal holes in electronic control tape which includes apparatus to prevent actuation of the operating handle unless the punching electors are aligned for properly punching registration and including apparatus for backspacing the tape for correction of errors or repunching.

This application relates further to improvements in a hand operated tape punching machine which was the subject matter of Patent No. 2,232,526 which patent issued Feb. 1, 1966. This prior described punching mechanism performed properly but the particular improvements embodied in this application are directed to a means and method for particularly insuring positive positioning of the tape perforating pins in relation to the tape to be punched such that the hand operated lever may be actuated only when the control lever is properly situated to properly punch the tape and to means for back spacing the tape. The mechanism disclosed herein likewise provides a locking device which does not permit the unit to be shifted into tape punching position unless the tape punching elements are in proper relation to the tape to be punched.

With the utilization of tape controlled machines it is of course essential that the controlling tape be properly punched and the punched holes be properly formed within the tape. The control mechanism described in this application provides a means for positively preventing the tape punching action unless the tape punching elements are in proper punching relation.

The standard tape punching mechanisms are well understood in the field and further information may be obtained regarding the utilization of the tape and its function in controlling the machine by referring to the aforementioned U.S. issued patent.

It is therefore an object of applicant's invention to provide an improved hand operated tape punching machine which will positively insure the proper alignment of the punching elements with the tape to be punched.

It is a further object of applicant's invention to provide a back spacing device for a hand operated tape punching machine which will, upon actuation thereof, step the tape rearwardly in the same increments as its forward advancement.

These and other objects and advantages of my invention will more fully appear from the following description made in connection with the accompanying drawings, wherein like reference characters refer to the same or similar parts throughout the several views, and in which.

Figure 1:
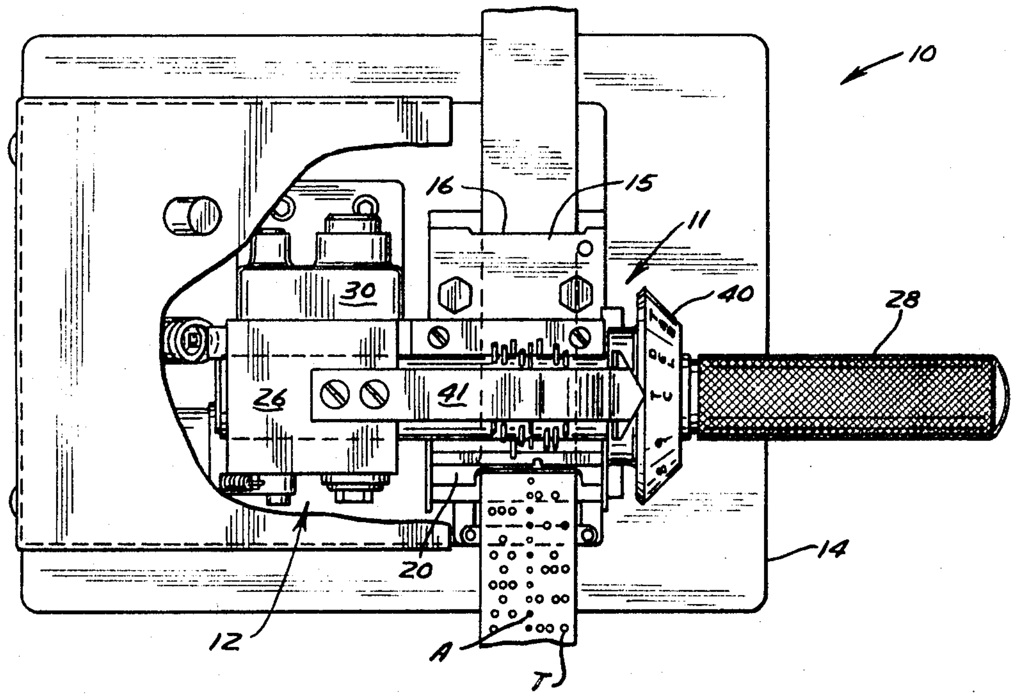
FIG. 1 is a top plan view of a tape punching machine embodying the concepts of applicant's invention and having certain cover portions thereof broken away to illustrate the interior operative portions thereof.
Figure 2:
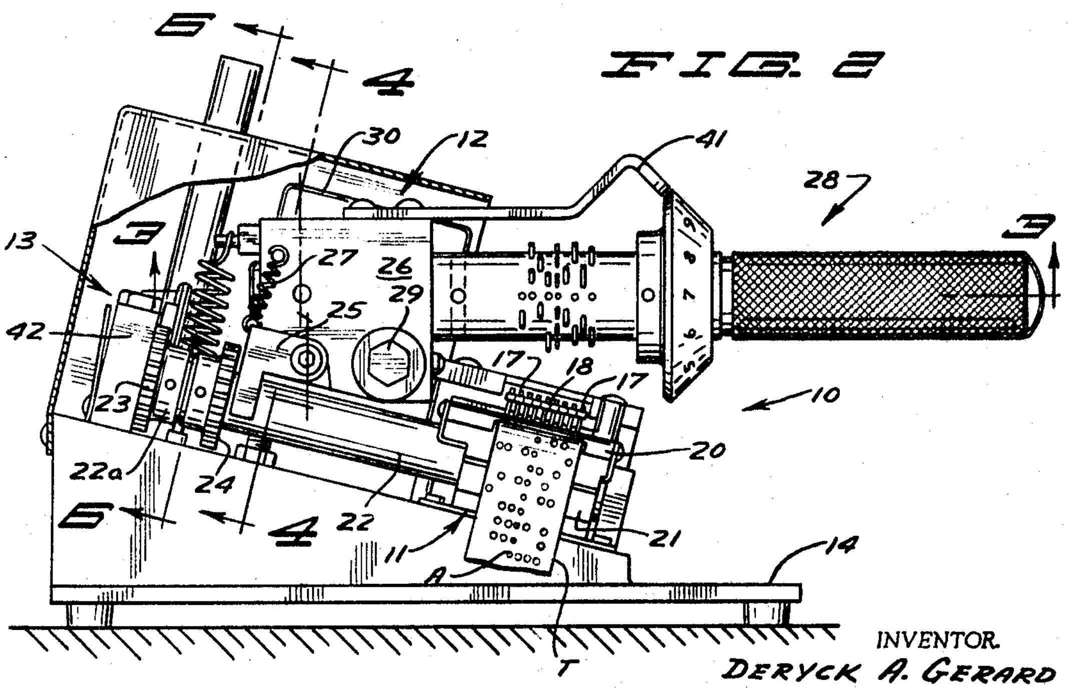
FIG. 2 is a side elevation again having certain cover portions removed to illustrate the operative elements thereof.

In accordance with the accompanying drawings the tape punching apparatus embodying the concepts of this invention is generally designated 10 and includes a punching section 11, drive section 12 and a return section 13, all mounted on a base member 14.

The perforating section 11 comprises a first guiding section 15 providing a slot 16 for the tape to pass therethrough which slot 16 constrains the tape against lateral and vertical movement. The tape passes through this guide slot 16 below a set of perforating pins 17—17 which pins are spring mounted through a series of spring lever arms 18—18 such that the punch member 17 will be retracted when the downward pressure is removed. The perforating pins 17—17 are designed to extend perpendicularly through the tape in transverse relation thereacross to provide a series of holes therethrough which holes convey the actual information into the machine to be controlled. A second guiding member 20 is provided in sequential relation following the punching elements 17—17 and is hingedly mounted upon a support block 21 or the like and this guide member 20 is substantially curved to direct the cut tape downwardly and hold the same against a driving member. Directly below this guide member 20 a drive shaft 22 is arranged and the drive shaft has the portion located under the tape to be in contacting driving relation to the tape. This driving relation could be in several forms and may take the form of a resilient rubber roller or the like which will grasp the tape or may in a second form take the shape of a toothed wheel element which is not illustrated but which is and would be designed to drive the tape forwardly by having drive members thereon engaged with the perforate sections A of the tape. All control tape is provided with the center line of drive holes A and by arranging a drive wheel on the shaft member 22. It should be obvious that the tape may be driven as desired.

Rotatable drive shaft 22 is rotatably mounted on one end thereof directly below the tape T and the other end thereof 22*a* is likewise rotatably mounted and in the form shown is provided with a pair of cog wheels 23–24 which wheels are used for advancing and reversing the direction of movement of the tape T. These cog wheels in the form shown are securely fastened to the shaft 22 and the first of said wheels 24 is used to drive the shaft in counterclockwise or tape advancing motion. This particular drive mechanism includes a ratchet type system wherein the ratchet 25 is pivotally attached to a lever block 26 and is spring loaded by spring 27 such that when the handle member 28 and lever bar 26 are pivoted downwardly about pivot 29 to form perforations in the tape T the pawl 25 will slip over and over ride the notches of the guide wheel 24 and not cause any motion of the rotatable shaft 22. However on the return stroke of the lever 28 into the upward position the pawl 25 will engage the cog wheel 24 and cause rotation of the shaft 22.

Figures 3, 4, 5:
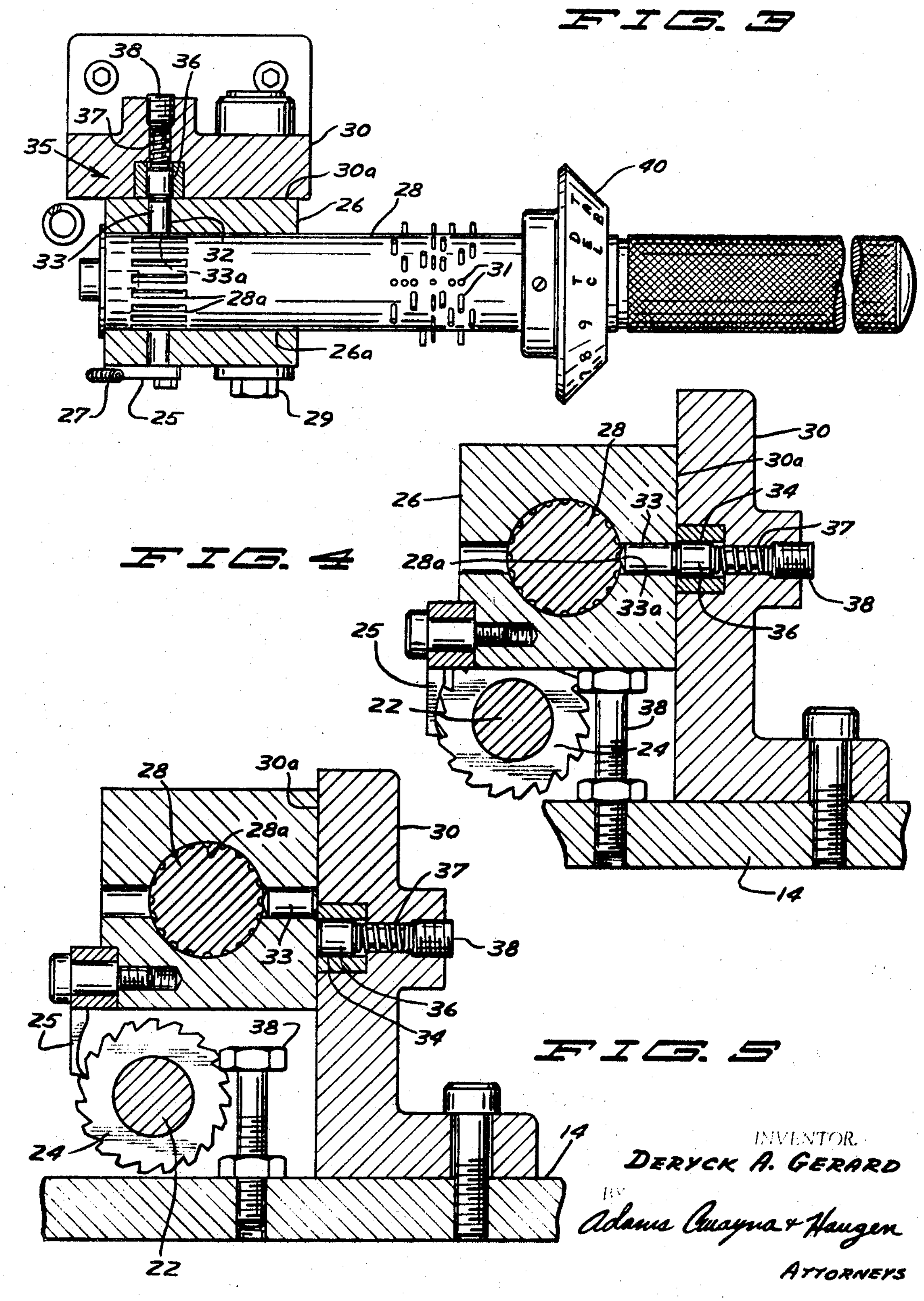
FIG. 3 is a horizontal section taken substantially along line 3—3 of FIG. 2.
FIG. 4 is a transverse section taken substantially along line 4—4 of FIG. 2 illustrating the control and locating mechanism thereof in a first position.
FIG. 5 is a view similar to FIG. 4 illustrating the control portion hereof in a second position.
Figure 6:
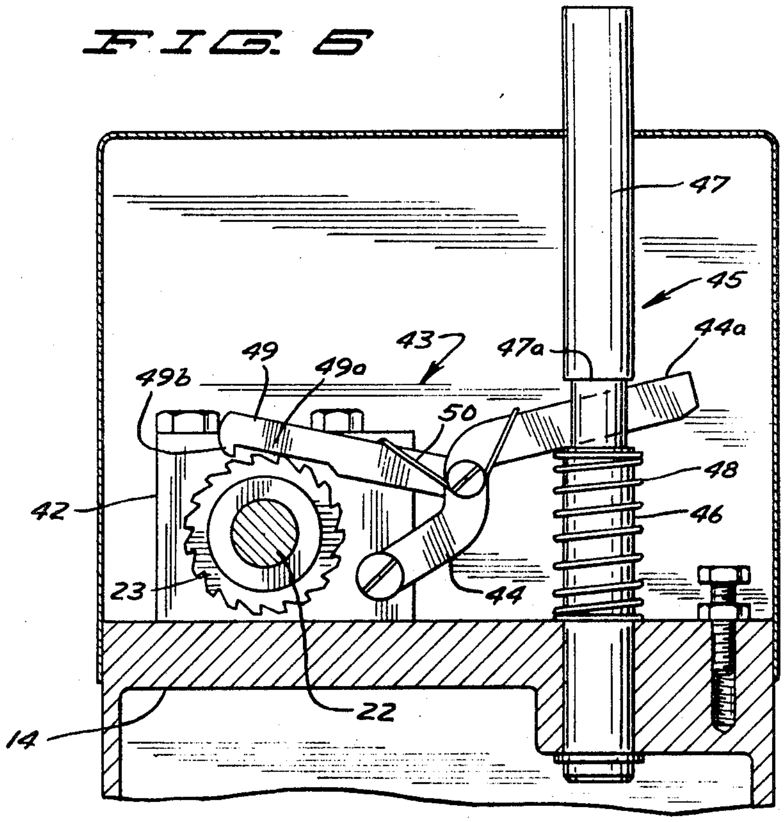
FIG. 6 is a transverse section taken substantially along line 6—6 of FIG. 2 illustrating the tape return mechanism.

Lever block assembly 26 is pivotally mounted on a first support member 30 mounted in upstanding relation upon the base 14 and is best illustrated in FIGS. 3, 4 and 5. As illustrated in these figures lever block 26 is provided with a passage 26*a* therethrough to house the lever member 28 therein. This block 26 is rotatably mounted for vertical oscillation against a bearing surface 30*a* of the support block 30 through pin 29 and the lever 28 and attached block 26 are normally free to oscillate and reciprocate against this bearing surface 30 in a vertical plane.

Lever member 28 is provided with a plurality of longitudinally extending radially spaced grooves 28*a* on one end thereof well within the lever block 26. These radially spaced grooves 28*a* are in corresponding positions with various positions of striker pin elements 31 arranged on the lever in longitudinally spaced relation to the slots radially about lever 20 such that the striker pin elements 31 will be positively located when in registration with the punch elements 17. The number of radially spaced locations of course may be varied in accordance with the type of machine being controlled and this location and arrangement will depend upon the number of control locations which is desirable for utilization in the controlled machine.

A locating device generally designated 35 is provided to cooperate between the support member 30 and lever 28 to positively orient the lever 28 in position such that the striker pin elements 31 will always be directly above the punch elements 17 when the handle is actuated. The concept behind this control system 35 is to provide a positive locating device for the pin elements 31 and a device which will prevent the rotation of the lever into striking position if these pins 31 are not properly oriented. This locating is accomplished by providing a first passage 32 and locating pin 33 within the lever block 26 in radially extensible relation with regard to the longitudinal slots 28*a*. This pin 33 is provided with reduced locating end 33*a* to engage any one of the slots 28*a* disposed directly radially in the line therewith. A passage 34 is provided in aligned relationship to the first of said passages 33 in the support block 30 and this alignment only takes place when the lever 28 is in its uppermost position. Within passage 34 a first spring loaded plunger device 36 is placed in close adjacent position to the bearing surface 30*a* of the support 30 such that this plunger 36 will normally abut pin 33 when the lever block 26 is in its uppermost position. A spring 37 is provided and is captured within passage 34 by a threadable element 38 received within the passage 34. From the drawings of FIGS. 4 and 5 it should be obvious that when the lever member 28 is properly located to dispose one of the longitudinal grooves 28*a* in receiving position to pin 33 and pin 33 will extend into the groove 28*a* and the size of the pin 33 is so determined that it would be free to slide past the bearing surface 30*a* of the support 30. This particular sliding effect is illustrated in FIG. 5 wherein the slot 28*a* in the lever has been properly oriented and the pin 33 is in proper relation thereto to permit sliding past the bearing surface 30*a*.

It should be obvious again from these drawings that if the grooves 28*a* on lever 28 are not properly matched to pin 33 they will force pin 33 rearwardly into the passage 34 and motion of the lever 28 will be prevented due to the interference now occuring between the pin 33 being shoved outwardly into the passage 34 against the spring loaded member 36. In order to maintain this proper vertical relation of the lever and alignment of the passages 33–34 a stop member such as a cap screw or the like 38 is affixed to the support plate 14 to prevent the lever block 26 moving upwardly past a vertical point.

In order to properly select the punch element locations 31 the lever member 28 is provided with an indicia bearing collar plate or the like 40 having the proper indicia inscribed thereon to relate to the punch sequence arranged with the punching elements 31. A reader or indicator pointer 41 is provided to cooperate with the lever block 26 and move therewith to properly point at the indicia picked on a collar plate 40.

To provide for the rearward movement of the top cog wheel 23 on shaft 22 is utilized. As aforementioned this end of the shaft 22 is rotatably mounted in mounting block 42 to provide the proper rotatable support for the shaft 22. In order to provide actuation for shaft 22 in a clockwise direction or in a direction which will reverse the movement of the tape, a second ratchet construction generally designated 43 is provided to engage the cog wheel 23 fixedly attached to shaft 22 normally allowing counterclockwise rotation thereof but in turn arranged to drive the same in a clockwise direction. This ratchet arrangement 43 includes a first mounting lever arm 44 pivotally attached to mounting block 42 which lever 44 is provided with a laterally extending actuating end portion 44*a* which end portion 44*a* is in operative association with a vertically shiftable actuating member 45. This actuating member in the form shown includes a first member 46 fixedly attached in vertical relationship to the base 14 and a second telescoping member 47 arranged axially therealong which telescoping member 47*a* provides a downwardly extending shoulder 47*a* to abut with the actuating end 44 of lever 44. A return spring element 48 is disposed below the actuating arm end 44*a* about stationary shaft 46 to operate between lever end 44*a* and the support plate 14 to normally urge the lever end 44*a* upwardly. A second element 49 is rotatably mounted on the first actuating element 44 and extends to overlie the cog wheel 23 on shaft 22. This member 49 is normally biased downward against said wheel 23 through a spring member 50 operating between the arm 49 and arm 44. A cog receiving depression 49*a* is provided to normally overlie and normally ride upon the cogs of cog wheel 23 and a hook end 49*b* is provided at the end thereof such that when the arm 49 is pulled to the right the hook 49*b* will engage one of the cogs of the cog wheel 23 and pull the same to the right or in a clockwise direction. It can be seen that normally the cogs of cog wheel 23 will ride upon and below the depressed area 49*a* of arm 49 such that when the wheel is turning in a counterclockwise direction the hook end 49*b* thereof is shifted upwardly out of normal cog engaging relationship but however, when the plunger 47 is depressed the arm 49 will be shifted to the right and will engage through the hook 49*b* one of the cogs to draw the cog wheel 23 one specific step at a time in a clockwise or rearward tape moving direction.

It should be obvious that applicant has provided a means through the rearward motion device to provide a simple corrective means for utilizing the tape punching machine. For example, should a wrong signal be punched into the tape it is only necessary to depress the plunger the proper number of times to shift the tape back to the proper position under the perforating members 17—17 thereafter and select the correction signal which will completely nulify the signal which has been punched in the tape at this location. From then it is possible to simply continue punching with the error having now been stricken out of the tape.

It should be obvious that applicant has provided several new and improved features for his previously developed tape punching machine which features allow the advantages of rearward of the tape such that corrections may be easily performed therein and a system which controls the unit such that should an improper alignment occur between the pin striking elements 31 and the punching elements 17 the lever will not be allowed to complete punching operation. This latter feature is very important as continually striking upon the punching elements at an improper angle could result in not only fast wear of the striker pins 17 and 31 but also breakage of the combined pins.

It will, of course, be understood that various changes may be made in the form, details, arrangements and proportion of parts without departing from the scope of my invention, which generally stated consists in the matter set forth in the appended claims.

What is claimed is:

1. Apparatus for punching electronic control tape and the like, said apparatus comprising:

(a) a support base;

(b) a plurality of tape punching elements;

(c) means defining a tape guiding path in punching relation to said punching elements;

(d) a bearing surface;

(e) a lever housing member mounted for rotation against said bearing surface;

(f) a lever member rotatably mounted in said housing and including:

(1) a plurality of radially spaced striking pin sets thereon for engaging said punching elements when said lever is swung into punching position;

(2) a plurality of locating positions corresponding to said pin sets; and (3) a locating element co-acting with said locating positions and said bearing surface permitting rotation of said housing thereon when engaged with one of said locating positions and preventing rotation of said housing when out of engagement with one of said locating positions; and (g) means for incrementally advancing the tape in response to the movement of said lever.

2. The structure set forth in claim 1 wherein said locating element is normally biased into one of said locating positions and is held therein by said bearing therefore when said housing is rotated.

3. The structure set forth in claim 2 and locating element receiving means in said bearing surface to receive a portion of said locating element when said element is removed from locating position to prevent movement of said lever housing.

4. The structure set forth in claim 1 and means for incrementally reversing the movement of the tape.

5. The structure set forth in claim 1 wherein said tape advancing means includes:

(a) a tape contacting and driving shaft;

(b) a first ratchet means operatively connected between said shaft and said lever housing to drive said tape in one direction.

6. The structure set forth in claim 5 and tape reversing means including:

(a) a second rotatable means operatively connected to said shaft permitting free rotation thereof in one direction and driving said shaft in an opposite direction; and (b) plunger means for selectively driving said second ratchet.

References Cited

UNITED STATES PATENTS

| | | | |
|---|---|---|---|
| 486,858 | 11/1892 | Cummins | 234—100 |
| 3,232,526 | 2/1966 | Gerard | 234—100 |
| 3,278,117 | 10/1966 | Post et al. | 234—100 |

WILLIAM S. LAWSON, Primary Examiner

U.S. Cl. X.R.

234—100, 129